United States Patent
Dolezilek et al.

(10) Patent No.: US 9,620,955 B2
(45) Date of Patent: *Apr. 11, 2017

(54) SYSTEMS AND METHODS FOR COMMUNICATING DATA STATE CHANGE INFORMATION BETWEEN DEVICES IN AN ELECTRICAL POWER SYSTEM

(71) Applicant: Schweitzer Engineering Laboratories, Inc., Pullman, WA (US)

(72) Inventors: David J. Dolezilek, Pullman, WA (US); Benjamin S. Day, Pullman, WA (US); Dennis Gammel, Pullman, WA (US); Ryan Bradetich, Pullman, WA (US); Jerry J Bennett, Pullman, WA (US); Christopher Ewing, Colfax, WA (US)

(73) Assignee: SCHWEITZER ENGINEERING LABORATORIES, INC., Pullman, WA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/841,260

(22) Filed: Mar. 15, 2013

(65) Prior Publication Data

US 2014/0280673 A1    Sep. 18, 2014

(51) Int. Cl.
*G06F 15/167* (2006.01)
*H02H 7/26* (2006.01)
(Continued)

(52) U.S. Cl.
CPC ........... *H02H 7/261* (2013.01); *H02H 1/0061* (2013.01); *H04L 67/2842* (2013.01)

(58) Field of Classification Search
CPC .................................................. H04L 67/2842
(Continued)

(56) References Cited

U.S. PATENT DOCUMENTS

| | | |
|---|---|---|
| 4,054,949 A | 10/1977 | Takezoe |
| 4,535,306 A | 8/1985 | Yamaguchi |

(Continued)

FOREIGN PATENT DOCUMENTS

| | | |
|---|---|---|
| GB | 2278519 | 11/1994 |
| JP | 10247377 | 9/1998 |

(Continued)

OTHER PUBLICATIONS

Bill Lichtensteiger, Branko Bjelajac, Christian Muller, Christian Wietfeld. "RF Mesh Systems for Smart Metering: System Architecture and Performance", Smart Grid Communications, IEEE, Oct. 2010.

(Continued)

*Primary Examiner* — Minh-Chau Nguyen
(74) *Attorney, Agent, or Firm* — John P. Davis (57) ABSTRACT

Systems and methods are presented for managing communication between devices in an electric power generation and delivery system. In certain embodiments, a method for managing communication messages performed by a network device included in an electric power generation and delivery system may include receiving a message including an identifier and data state information via a communications interface. A determination may be made that that the message represents a data state change associated with the identifier. The message may be stored in a message buffer associated with the identifier. Finally, the stored message may be transmitted from the message buffer to an intelligent electronic device.

17 Claims, 7 Drawing Sheets

(51) Int. Cl.
  *H04L 29/08* (2006.01)
  *H02H 1/00* (2006.01)
(58) Field of Classification Search
  USPC .................................................. 709/213
  See application file for complete search history.

(56) References Cited

U.S. PATENT DOCUMENTS

| | | | |
|---|---|---|---|
| 4,546,486 A | 10/1985 | Evans | |
| 4,768,178 A | 8/1988 | Conklin | |
| 4,808,884 A | 2/1989 | Hull | |
| 5,103,466 A | 4/1992 | Bazes | |
| 5,235,590 A | 8/1993 | Taguchi | |
| 5,363,377 A | 11/1994 | Sharpe | |
| 5,596,263 A | 1/1997 | Zavis | |
| 5,630,757 A | 5/1997 | Gagin | |
| 5,699,367 A | 12/1997 | Haartsen | |
| 5,793,869 A | 8/1998 | Claflin | |
| 6,456,831 B1 | 9/2002 | Tada | |
| 6,535,925 B1 | 3/2003 | Svanbro | |
| 6,577,628 B1 | 6/2003 | Hejza | |
| 6,608,841 B1 | 8/2003 | Koodli | |
| 6,678,134 B2 | 1/2004 | Sugiura | |
| 6,751,209 B1 | 6/2004 | Hamiti | |
| 6,754,210 B1 | 6/2004 | Ofek | |
| 6,847,691 B2 | 1/2005 | Torikoshi | |
| 6,859,742 B2 | 2/2005 | Randall | |
| 6,891,441 B2 | 5/2005 | Rochow | |
| 6,937,683 B1 | 8/2005 | Ratzel | |
| 6,947,269 B2 | 9/2005 | Lee | |
| 6,973,085 B1 | 12/2005 | Acharya | |
| 7,239,581 B2 | 7/2007 | Delgado | |
| 7,272,201 B2 | 9/2007 | Whitehead | |
| 7,283,568 B2 | 10/2007 | Robie | |
| 7,463,467 B2 | 12/2008 | Lee | |
| 7,571,216 B1 | 8/2009 | McRae | |
| 7,617,408 B2 | 11/2009 | Frazier | |
| 7,664,869 B2 | 2/2010 | Baker | |
| 7,701,683 B2 | 4/2010 | Morris | |
| 8,082,367 B2 | 12/2011 | Etheridge | |
| 8,351,433 B2 | 1/2013 | Morris | |
| 8,578,012 B2 | 11/2013 | Bradetich | |
| 8,793,767 B2 | 7/2014 | Schweitzer | |
| 8,819,512 B1 | 8/2014 | Wang | |
| 9,065,763 B2 | 6/2015 | Kasztenny | |
| 9,270,109 B2 | 2/2016 | Dolezilek | |
| 2001/0023464 A1 | 9/2001 | Deck | |
| 2002/0069299 A1 | 6/2002 | Rosener | |
| 2002/0080808 A1 | 6/2002 | Leung | |
| 2003/0195975 A1 | 10/2003 | Papadopoulos | |
| 2003/0204756 A1* | 10/2003 | Ransom ................. | G01D 4/004 713/300 |
| 2004/0138786 A1 | 7/2004 | Blackett | |
| 2004/0138834 A1* | 7/2004 | Blackett ................. | G06Q 50/06 702/62 |
| 2004/0148552 A1 | 7/2004 | Matsumoto | |
| 2004/0196855 A1 | 10/2004 | Davies | |
| 2004/0213214 A1 | 10/2004 | Jung | |
| 2005/0025105 A1 | 2/2005 | Rue | |
| 2005/0085279 A1 | 4/2005 | Aoki | |
| 2005/0160184 A1 | 7/2005 | Walsh | |
| 2006/0029105 A1 | 2/2006 | Kasztenny | |
| 2006/0123119 A1 | 6/2006 | Hill | |
| 2006/0156383 A1 | 7/2006 | Waris | |
| 2007/0002746 A1 | 1/2007 | Shankar | |
| 2007/0058320 A1 | 3/2007 | Lee | |
| 2007/0096942 A1* | 5/2007 | Kagan et al. ............ | 340/870.02 |
| 2007/0127487 A1 | 6/2007 | Kim | |
| 2007/0147415 A1 | 6/2007 | Marusca | |
| 2007/0168161 A1* | 7/2007 | Vellore ................. | G06Q 10/06 702/182 |
| 2007/0252724 A1* | 11/2007 | Donaghey et al. ......... | 340/905 |
| 2007/0258445 A1 | 11/2007 | Smith | |
| 2007/0291780 A1 | 12/2007 | Smith | |
| 2008/0005484 A1 | 1/2008 | Joshi | |
| 2008/0068291 A1 | 3/2008 | Yuan | |
| 2008/0071482 A1 | 3/2008 | Zweigle | |
| 2008/0101251 A1 | 5/2008 | Casebolt | |
| 2008/0127210 A1* | 5/2008 | Bosold et al. ............ | 719/313 |
| 2008/0188264 A1 | 8/2008 | Duan | |
| 2008/0189784 A1 | 8/2008 | Mangione-Smith | |
| 2008/0192635 A1 | 8/2008 | Usuda | |
| 2008/0219186 A1 | 9/2008 | Bell | |
| 2008/0235355 A1 | 9/2008 | Spanier | |
| 2008/0267090 A1 | 10/2008 | Okita | |
| 2009/0052392 A1 | 2/2009 | Sumasu | |
| 2009/0141727 A1 | 6/2009 | Brown | |
| 2009/0160189 A1 | 6/2009 | Rasmussen | |
| 2009/0180477 A1 | 7/2009 | Akahane | |
| 2009/0254655 A1 | 10/2009 | Kidwell | |
| 2009/0260083 A1 | 10/2009 | Szeto | |
| 2009/0300165 A1* | 12/2009 | Tuckey et al. ............ | 709/224 |
| 2009/0319904 A1 | 12/2009 | Rensin | |
| 2010/0020773 A1 | 1/2010 | Jechoux | |
| 2010/0040068 A1 | 2/2010 | Wimmer | |
| 2010/0054164 A1 | 3/2010 | Lucani | |
| 2010/0082792 A1* | 4/2010 | Johnson ................. | G01D 4/004 709/223 |
| 2010/0104044 A1 | 4/2010 | Kishigami | |
| 2010/0142560 A1 | 6/2010 | Sharivker | |
| 2010/0169876 A1* | 7/2010 | Mann ................... | G06F 8/65 717/170 |
| 2010/0182952 A1 | 7/2010 | Jeong | |
| 2010/0195763 A1 | 8/2010 | Lee | |
| 2010/0215004 A1 | 8/2010 | Yoo | |
| 2010/0251134 A1 | 9/2010 | Van Seggelen | |
| 2010/0275086 A1 | 10/2010 | Bergquist | |
| 2011/0022666 A1 | 1/2011 | Pinto | |
| 2011/0069709 A1* | 3/2011 | Morris ................. | H04L 47/527 370/394 |
| 2011/0069718 A1* | 3/2011 | Morris et al. ........... | 370/419 |
| 2012/0005326 A1 | 1/2012 | Bradetich | |
| 2012/0078555 A1 | 3/2012 | Banhegyesi | |
| 2012/0082048 A1 | 4/2012 | Taft | |
| 2012/0155458 A1 | 6/2012 | Larson | |
| 2012/0195309 A1 | 8/2012 | Okuda | |
| 2012/0215479 A1* | 8/2012 | Pamulaparthy et al. ..... | 702/122 |
| 2012/0278421 A1* | 11/2012 | Sun et al. ............... | 709/208 |
| 2013/0018521 A1 | 1/2013 | Manson | |
| 2013/0039266 A1 | 2/2013 | Ekici | |
| 2013/0091258 A1 | 4/2013 | Shaffer | |
| 2013/0117755 A1* | 5/2013 | Bontempi ................ | 718/103 |
| 2013/0142336 A1 | 6/2013 | Fries | |
| 2014/0025321 A1 | 1/2014 | Spanier | |
| 2014/0195844 A1* | 7/2014 | Laval ................... | G06F 11/3062 713/340 |
| 2014/0269736 A1 | 9/2014 | Kasztenny | |

FOREIGN PATENT DOCUMENTS

| | | |
|---|---|---|
| JP | 2001221871 | 8/2001 |
| JP | 2001221874 | 8/2001 |
| WO | 0016525 | 3/2000 |
| WO | 0057527 | 9/2000 |
| WO | 2005088911 | 9/2005 |

OTHER PUBLICATIONS

Fateri, Sina, et al. "Design and Analysis of Multicast-Based Publisher/Subscriber Models over Wireless Platforms for Smart Grid Communications." Trust, Security and Privacy in Computing and Communications (TrustCom), 2012 IEEE 11th International Conference on. IEEE, 2012.

Maheswaran, O., A. Kavitha Lakshmi, and R. Malarvizhi. "Guidelines for specification and evaluation of substation automation projects based on IEC 61850." CIGRE India Journal 1.1 (Jan. 2012): 30-35.

Brantley, Robert, Jacobus Theron, and Eric Udren. "The Application of IEC® 61850 to Replace Auxiliary Devices Including Lockout Relays." 60th Annual Georgia Tech Protective Relaying Conference May 2006.

(56) References Cited

OTHER PUBLICATIONS

Xyngi., and M. Popov. "IEC61850 overview—where protection meets communication." (2010): 46-46.

Smith, T., J. Vico , and Craig Wester. "Advanced distribution reclosing using wireless communications." Rural Electric Power Conference (REPC), 2011 IEEE. IEEE, 2011.

Ozansoy, Cagil R., Aladin Zayegh, and Akhtar Kalam. "The real-time publisher/subscriber communication model for distributed substation sustems." Power Delivery, IEEE Transactions on 22.3 (2007): 1411-1423.

PCT/US2014/016955 Patent Cooperation Treaty, International Search Report and Written Opinion of the International Searching Authority, Jun. 5, 2014.

Roy Moxley, Ken Fodero, and Hector J. Altuve, Updated Transmission Line Protection Communications, IEEE, Oct. 2008.

James W. Rice, Sam Fulford, and Nicholas C. Seeley, Improved Service Reliability for Rural Electric Customers—Innovative Auto-Restoration Following Loss of Primary Source Interconnection, Sep. 2006.

Nicholas C. Seeley, Automation at Protection Speeds: IEC 61850 GOOSE Messaging as a Reliable, High-Speed Alternative to Serial Communications, Feb. 2008.

S. Ward, W. Higinbotham, E. Duvelson, Inside the Cloud—Network Communications Basics for the Relay Engineer, 34th Annual Western Protective Relay Conference, Oct. 2007.

PCT/US2010/049169 Patent Cooperation Treaty Notification of Transmittal of the International Search Report and the Written Opinion, International Search Report, and Written Opinion, Nov. 5, 2010.

D.L. Mills, Experiments in Network Clock Synchronization, Network Working Group Request for Comments: 957, Sep. 1985.

D. Mills, Simple Network Time Protocol (SNTP) Version 4 for IPv4, IPv6, and OSI, Network Working Group Request for Comments: 4330, Jan. 2006.

Daqing Hou, Dave Dolezilek, IEC 61850—What It Can and Cannot Offer to Traditional Protection Schemes, Sep. 2008.

PCT/US2011/039498 Patent Cooperation Treaty, International Search Report and Written Opinion of the International Searching Authority, Oct. 21, 2011.

W. Kleinebreg, ABB Switzerland Ltd., Hirschmann Automation & Control GmbH, IEC 61850 Modeling of Switches, Dec. 2009.

PCT/US2014/023169 Patent Cooperation Treaty, International Search Report and Written Opinion of the International Searching Authority, Aug. 19, 2014.

\* cited by examiner

SYSTEMS AND METHODS FOR COMMUNICATING DATA STATE CHANGE INFORMATION BETWEEN DEVICES IN AN ELECTRICAL POWER SYSTEM

TECHNICAL FIELD

This disclosure relates to systems and methods for managing communication between devices in an electric power generation and delivery system and, more particularly, to systems and methods for communicating data change information between network devices and intelligent electronic devices included in an electric power generation and delivery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

IEDs may communicate with other IEDs, monitored equipment, and/or network devices using one or more suitable communication protocols and/or standards. In certain embodiments one or more IED devices included in an electric power generation and delivery system may communicate using a variety of protocols, such as IEC 61850 GOOSE (Generic Object Oriented Substation Events), SV (Sampled Values), MMS (Manufacturing Messaging Specification), SEL Fast Message (FM), and/or Mirrored Bits®. GOOSE may be similarly utilized to facilitate communication between IEDs and GOOSE-enabled pieces of monitored equipment and/or network devices. For example, IEDs, monitored equipment, and/or network devices may communicate (e.g., transmit and/or receive) messages (e.g., GOOSE messages) that include bits, bit pairs, measurement values, and/or any other relevant data elements. In certain circumstances, GOOSE may allow a message generated from a single device to be transmitted to multiple receiving devices (e.g., subscriber devices and/or particular receiving devices designated or identified in a GOOSE message).

Some communications between IEDs, monitored equipment, and/or network devices may be more urgent and/or important than other communications. For example, control data or real time samples used in monitoring, controlling, automating, and/or protecting an electric power generation and delivery system or its components may be particularly valuable (e.g., time sensitive) for a certain period of time. Similarly, indications as to a state (e.g., a measured state) of one or more components and/or conditions within an electrical power generation and delivery system may be important to communicate relatively contemporaneous with a data state change event. Under increased network loads, however, it may be difficult for a device to discriminate between urgent and less-urgent communications. For example, a receiving IED may include a finite receiving FIFO that may only store a predetermined number of messages, and thus may not be capable of storing additional messages if the number of messages received exceed the capacity of the FIFO in a given time period. Similarly, communication bottlenecks (e.g., in a wireless radio system) may cause some messages to be lost or delayed.

Certain systems and methods may be utilized by a receiving IED to optimize the handling of network data by the IED. For example, in some embodiments, systems and methods for managing network communications by an IED may include a FIFO for storing a predetermined number of messages originating from a plurality of other devices and a plurality of buffers each for holding at least one message (e.g., a message buffer), as disclosed in U.S. Patent Publication No. 2011/0069709, the entirety of which is herein incorporated by reference. In such systems and methods, messages received in the FIFO may be examined to determine a subscription identifier with which messages are associated. Messages may then be routed to and stored into an appropriate buffer for accessing and processing by the receiving IED. By utilizing a message buffer, urgent and/or important messages may be stored by a receiving IED even under heavy network message traffic conditions.

Systems and methods disclosed herein may utilize a message buffer in network devices to address issues caused by network and/or communication traffic congestion. In certain embodiments, a method for managing communication messages performed by a network device may include receiving a message and an associated identifier via a communications interface of the network device. IEDs may publish multi-cast messages until data within the message payload changes. In certain embodiments, a state number associated with the message may represent a change in the message payload, and an incrementing sequence number associated with the message may indicate a number of messages that have been published reflecting a present data state. When the message payload changes (e.g., a data state and/or a state change), the state number may be incremented to reflect a new data state and the sequence number may be reset. Using a processor included in the network device, a determination may be made that the message indicates a change of data (e.g., a change of data state) from an previous message (e.g., a preceding message) associated with the identifier based, for example, on a different state number. Additionally, a determination may be made that that the message is the most recently received message associated with the identifier. Based on the determination(s), the message(s) may be stored in a message buffer associated with the identifier and eventually be transmitted to an IED associated with the network device using a suitable output queuing methodology.

Figure 1:
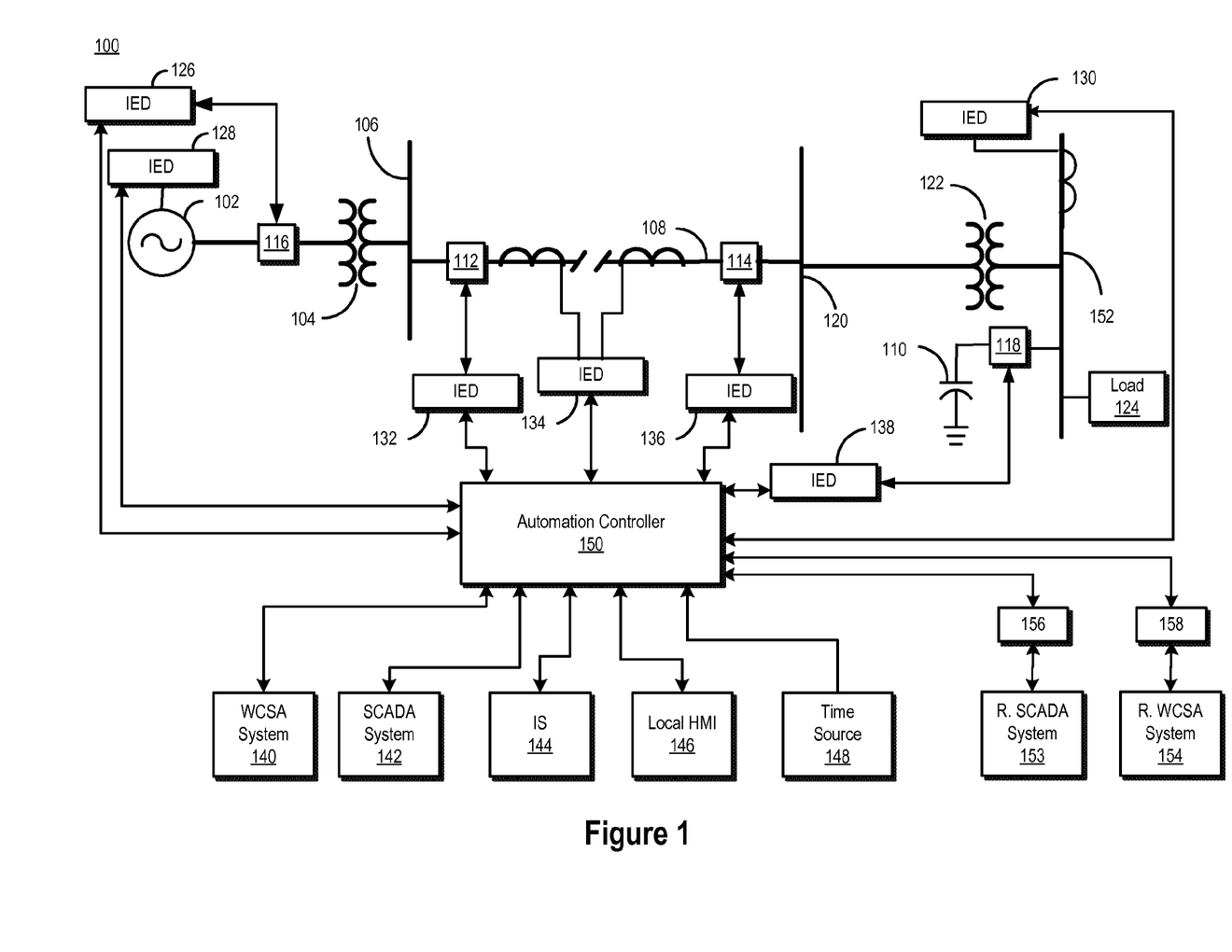
FIG. 1 illustrates a simplified diagram of an exemplary electric power generation and delivery system consistent with embodiments disclosed herein

FIG. 1 illustrates a simplified diagram of an exemplary electric power generation and delivery system 100 consistent with embodiments disclosed herein. The systems and methods described herein may be applied and/or implemented in a system such as the exemplary system electric power generation and delivery system 100 illustrated in FIG. 1. The electric power generation and delivery system 100 may include, among other things, an electric generator 102, configured to generate an electrical power output, which in some embodiments may be a sinusoidal waveform. Although illustrated as a one-line diagram for purposes of simplicity, an electrical power generation and delivery system 100 may also be configured as a three-phase power system.

A step-up power transformer 104 may be configured to increase the output of the electric generator 102 to a higher voltage sinusoidal waveform. A bus 106 may distribute the higher voltage sinusoidal waveform to a transmission line 108 that in turn may connect to a bus 120. In certain embodiments, the system 100 may further include one or more breakers 112-118 that may be configured to be selectively actuated to reconfigure the electric power generation and delivery system 100. A step down power transformer 122 may be configured to transform the higher voltage sinusoidal waveform to lower voltage sinusoidal waveform that is suitable for delivery to a load 124.

The IEDs 126-138, illustrated in FIG. 1, may be configured to control, monitor, protect, and/or automate the one or more elements of the electric power generation and delivery system. An IED may be any processor-based device that monitors, controls, automates, and/or protects monitored equipment within an electric power generation and delivery system (e.g., system 100). In some embodiments, the IEDs 126-138 may gather status information from one or more pieces of monitored equipment (e.g., generator 102). Further, the IEDs 126-138 may receive information concerning monitored equipment using sensors, transducers, actuators, and the like. Although FIG. 1 illustrates one IED monitoring transmission line 108 (e.g., IED 134) and another IED controlling a breaker (e.g., IED 136), these capabilities may be combined into a single IED.

FIG. 1 illustrates IEDs 126-138 performing various functions for illustrative purposes and does not imply any specific arrangements or functions required of any particular IED. In some embodiments, IEDs 126-138 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 126-138 may be configured to communicate calculations, such as phasors (which may or may not be synchronized as synchrophasors), events, fault distances, differentials, impedances, reactances, frequency, and the like. IEDs 126-138 may also communicate settings information, IED identification information, communications information, status information, alarm information, and the like. Information of the types listed above, or more generally, information about the status of monitored equipment, may be generally referred to herein as monitored system data.

In certain embodiments, IEDs 126-138 may issue control instructions to the monitored equipment in order to control various aspects relating to the monitored equipment. For example, an IED (e.g., IED 136) may be in communication with a circuit breaker (e.g., breaker 114), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be generally referred to as control instructions.

IEDs 126-138 may be communicatively linked together using a data communications network, and may further be communicatively linked to a central monitoring system, such as a supervisory control and data acquisition (SCADA) system 142, an information system (IS) 144, and/or a wide area control and situational awareness (WCSA) system 140. In certain embodiments, various components of the electrical power generation and delivery system 100 illustrated in FIG. 1 may be configured to generate, transmit, and/or receive GOOSE messages, or communicate using any other suitable communication protocol. For example, an automation controller 150 may communicate certain control instructions to IED 126 via messages using a GOOSE communication protocol.

The illustrated embodiments are configured in a star topology having an automation controller 150 at its center, however, other topologies are also contemplated. For example, the IEDs 126-138 may be communicatively coupled directly to the SCADA system 142 and/or the WCSA system 140. The data communications network of the system 100 may utilize a variety of network technologies, and may comprise network devices such as modems, routers, firewalls, virtual private network servers, and the like. Further, in some embodiments, the IEDs 126-138 and other network devices (e.g., one or more communication switches or the like) may be communicatively coupled to the communications network through a network communications interface.

Consistent with embodiments disclosed herein, IEDs 126-138 may be communicatively coupled with various points to the electric power generation and delivery system 100. For example, IED 134 may monitor conditions on transmission line 108. IEDs 126, 132, 136, and 138 may be configured to issue control instructions to associated breakers 112-118. IED 130 may monitor conditions on a bus 152. IED 128 may monitor and issue control instructions to the electric generator 102, while IED 126 may issue control instructions to breaker 116.

In certain embodiments, communication between and/or the operation of various IEDs 126-138 and/or higher level systems (e.g., SCADA system 142 or IS 144) may be facilitated by an automation controller 150. The automation controller 150 may also be referred to as a central IED, access controller, communications processor, and/or information processor. In various embodiments, the automation controller 150 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. Nos. 5,680,324, 7,630,863, and U.S. Patent Application Publication No. 2009/0254655, the entireties of which are incorporated herein by reference.

The IEDs 126-138 may communicate a variety of types of information to the automation controller 150 including, but not limited to, status and control information about the individual IEDs 126-138, IED settings information, calculations made by the individual IEDs 126-138, event (e.g., a fault) reports, communications network information, network security events, and the like. In some embodiments, the automation controller 150 may be directly connected to one or more pieces of monitored equipment (e.g., electric generator 102 or breakers 112-118).

The automation controller 150 may also include a local human machine interface (HMI) 146. In some embodiments, the local HMI 146 may be located at the same substation as automation controller 150. The local HMI 146 may be used to change settings, issue control instructions, retrieve an event report, retrieve data, and the like. The automation controller 150 may further include a programmable logic controller accessible using the local HMI 146. In certain embodiments, the automation controller 150 and/or any other system illustrated in FIG. 1 may be further communicatively coupled with one or more remote systems or IEDs including, for example, a remote SCADA system 153 and/or a remote WCSA system 154 via one or more network devices 156, 158 and/or interfaces.

The automation controller 150 may also be communicatively coupled to a time source (e.g., a clock) 148. In certain embodiments, the automation controller 150 may generate a time signal based on the time source 148 that may be distributed to communicatively coupled IEDs 126-138. Based on the time signal, various IEDs 126-138 may be configured to collect and/or calculate time-aligned data points including, for example, synchrophasors, and to implement control instructions in a time coordinated manner. In some embodiments, the WCSA system 140 may receive and process the time-aligned data, and may coordinate time synchronized control actions at the highest level of the electrical power generation and delivery system 100. In other embodiments, the automation controller 150 may not receive a time signal, but a common time signal may be distributed to IEDs 126-138.

The time source 148 may also be used by the automation controller 150 for time stamping information and data. Time synchronization may be helpful for data organization, real-time decision-making, as well as post-event analysis. Time synchronization may further be applied to network communications. The time source 148 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a global positioning system (GPS) receiver with time decoding. In the absence of a discrete time source 148, the automation controller 150 may serve as the time source 148 by distributing a time synchronization signal.

To maintain voltage and reactive power within certain limits for safe and reliable power delivery, an electrical power generation and delivery system may include switched capacitor banks (SCBs) (e.g., capacitor 110) configured to provide capacitive reactive power support and compensation in high and/or low voltage conditions within the electrical power system. For example, when power along a transmission line included in the electrical power system meets certain predetermined criteria, the capacitors within the SCB may be switched on (e.g., via breaker 118) by an IED to maintain a proper balance of reactive power. Further, an electrical power generation and delivery system 100 may include an OLTC configured to control the quality of electric power delivered to loads associated with the electrical power system by varying transformer tap positions within the OLTC. Like the SCB, the functionality of the OLTC may be controlled using an IED.

Figure 2:
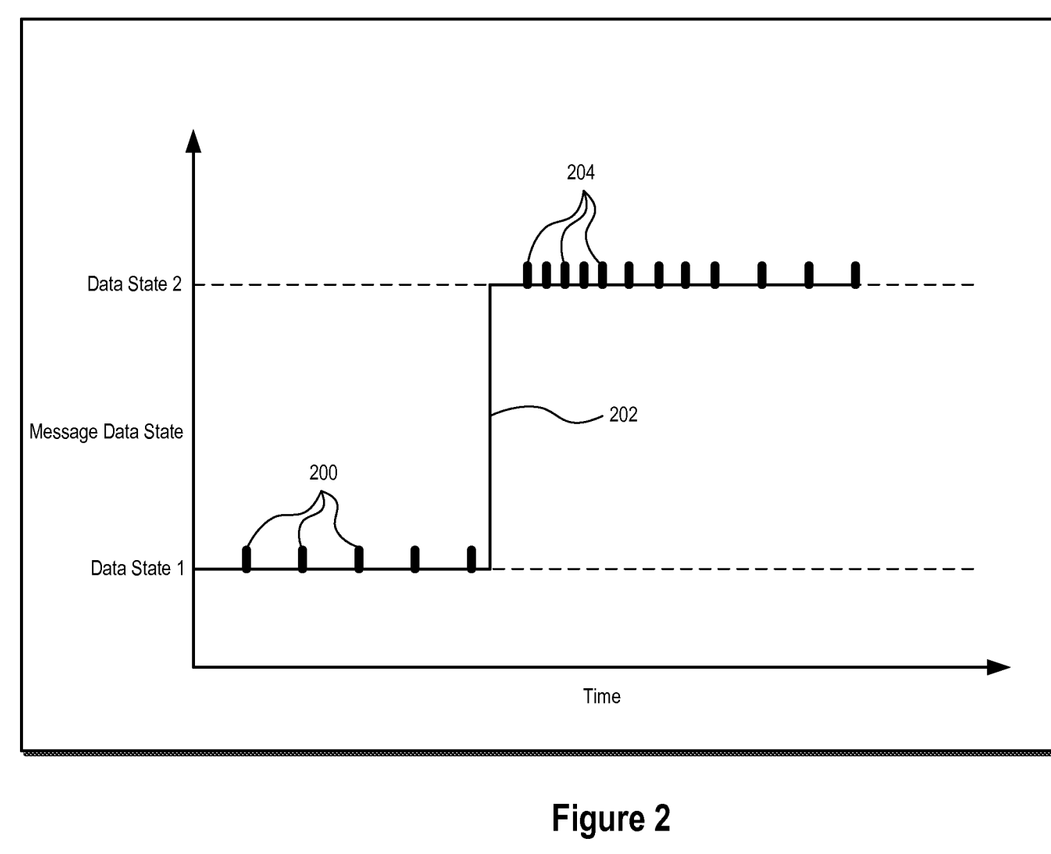
FIG. 2 illustrates an exemplary timing diagram showing transmission of messages by an intelligent electronic device prior to and after a data state change consistent with embodiments disclosed herein.

FIG. 2 illustrates an exemplary timing diagram showing transmission of messages 200, 204 by an IED consistent with embodiments disclosed herein. A message may include one or more control instructions, monitored system data, communications with other IEDs, monitored equipment and/or other network devices, and/or any other relevant communication, message, or data. In certain embodiments, a message may provide an indication as to a state and/or a data state (e.g., a measured state) of one or more components and/or conditions within an electrical power generation and delivery system. For example, a message may provide an indication of a measured current and/or voltage exceeding one or more thresholds. A certain state (e.g., "Data State 1 ") may be associated with a measurement exceeding such a threshold, while another state (e.g., "Data State 2 ") may be associated with a measurement exceeding a different threshold. A message indicating a particular data state may be utilized to determine whether the measured current and/or voltage exceed the one or more thresholds. Similarly, a message may indicate a state of a component of an electric power generation and delivery system such as a state of a breaker (e.g., "open" or "closed"), a power storage device (e.g., "charged" or "depleted"), and/or the like.

In certain embodiments, messages indicating a state may be embodied as GOOSE messages. A message may further indicate not only a particular data state, but also whether the message indicates a data state that is different than a data state indicated by one or more preceding message. That is, a message may include an indication that data associated with the message represents a data state change from a prior message. In certain embodiments, the prior message may be an immediately preceding message. In certain embodiments, data state change information may be indicated by a data state change indicator (DSCI) included in the message. For example, a DSCI included in a message may be set to "1" following a first state change event. Accordingly to some embodiments, the DSCI may be asserted in only a first message following a state change event. In other embodiments, the DSCI may be asserted for a specified period of time or for a specified number of messages. The DSCI may be set to a different value upon a subsequent data state change event. By utilizing a DSCI, a receiving device may determine that a particular message indicates a recent state change without having to examine certain contents (e.g., state information) of the message and/or previously received messages.

In certain embodiments, an IED may transmit to subscribing devices and/or receive from publishing (e.g., transmitting) devices messages 200 reflecting a particular data state (e.g., "Data State 1 ") at periodic intervals at a first communication rate after a certain period in which the state has remained constant. For example, if a measured data state has not changed within the last 30 seconds, an IED may transmit messages 200 at periodic intervals at the first communication rate. In certain embodiments, this periodic interval may be relatively long, reflecting that a data state change has not recently occurred. Transmitting similar data state messages periodically may introduce a degree of redundancy, helping to ensure that subscribing devices receive messages during periods of network congestion and/or low network bandwidth conditions.

When a data state change occurs (e.g., at 202), the IED may publish and/or receive messages 204 reflecting the changed state (e.g., "Data State 2 ") at periodic intervals having a second communication rate. As illustrated, in certain embodiments, the second communication rate may be faster than the first communication rate. Accordingly, the period between sequential messages 204 may be shorter than the period between sequential messages 200. As time progresses following the data state change event 202, the communication rate of the messages 204 may progressively slow to reach, for example, a rate at or near the first communication rate. In this manner, state messages may be transmitted at a relatively fast rate immediately following a data state change event 202 that progressively slows as the data state change event 202 becomes older. According to some embodiments, the transmission rate may decrease exponentially for a period of time following the data state change event 202.

Transmitting measured data state messages at a faster rate after a data state change event 202 may ensure that devices subscribing to the communications (e.g., subscribing IEDs) are more likely to receive the messages indicating the data state change more closely to the actual data state change event 202. Transmitting redundant messages at a relatively fast rate, however, may introduce network congestion and/or bandwidth issues in certain network devices (e.g., communication switches, routers, radios, multiplexors, a real-time automation controller, PLCs, and/or the like). Consistent with embodiments disclosed herein, a message buffer may be utilized in such network devices to ensure that data state change messages are properly transmitted and/or routed under congested network or low network bandwidth conditions.

Figure 3A:
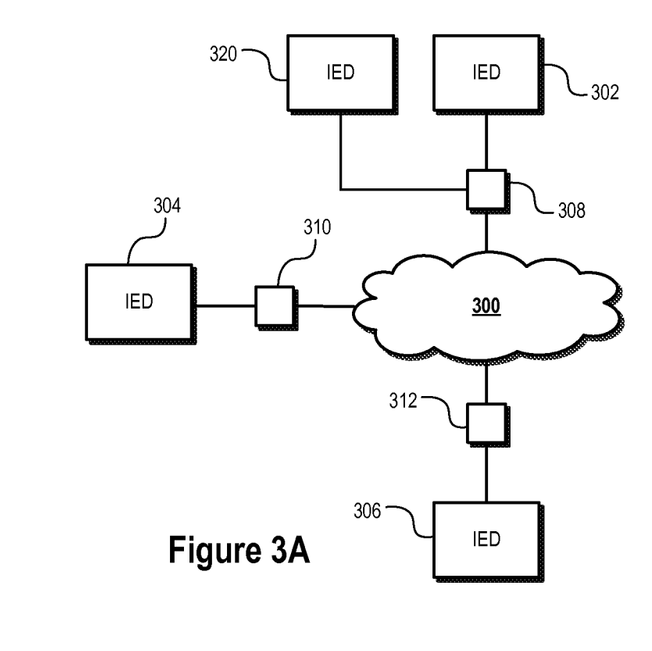
FIG. 3A illustrates intelligent electronic devices communicatively coupled with a network via network devices consistent with embodiments disclosed herein.

FIG. 3A illustrates IEDs 302-306, 318, 320 communicatively coupled with a network 300 via network switches 308-312 consistent with embodiments disclosed herein. Although embodiments illustrated in FIG. 3A are discussed in reference to network switches 308-312, further embodiments may be implemented in other suitable network devices. As discussed above, IEDs 302-306, 318, 320 may be configured to communicate via a network 300 using messages (e.g., GOOSE messages) that, in certain embodiments, may provide an indication as to a data state of one or more components and/or conditions within an electrical power generation and delivery system.

The network switches 308-312 may be configured to receive messages from the network 300 and to transmit certain messages to an associated IED 302-306, 318, 320. For example, network switch 308 may be configured to receive messages from the network 300 and to transmit certain of the received messages to IED 302 and/or IED 320. As discussed above, in certain circumstances, a receiving IED (e.g., IED 302 and/or 320) may include a finite receiving FIFO that may only store a predetermined number of messages, and thus may not be capable of storing certain messages if a significant number of messages are received in a relatively short period (e.g., during periods of high network message traffic). Similarly, a network switch (e.g., network switch 308) may have a limited transfer rate that is lower than its receiving rate. For example, a network switch may have a 1 MB/second data transmission rate but a receiving rate that is substantially greater. If such a network switch includes a finite receiving and/or transmitting buffer and a substantial amount of data (e.g., messages) is received by such a network switch in a short period of time, the network switch may be unable to transmit received messages before the finite buffers become full and thus messages may be dropped or lost.

Consistent with certain embodiments, network switches 308-312 may include one or more message buffers configured to store messages indicating data state changes of a number of messages received from the network 300. As detailed below in reference to FIG. 4A and FIG. 4B, messages stored in the one or more message buffers may be transmitted to a receiving IED 302-306, 318, 320, thereby ensuring that messages associated with a data state change are transmitted to the one or more IEDs 302-306, 318, 320, regardless of whether the network switches 308-312, 318, 320 are capable of processing all incoming message traffic from the network 300.

Figure 3B:
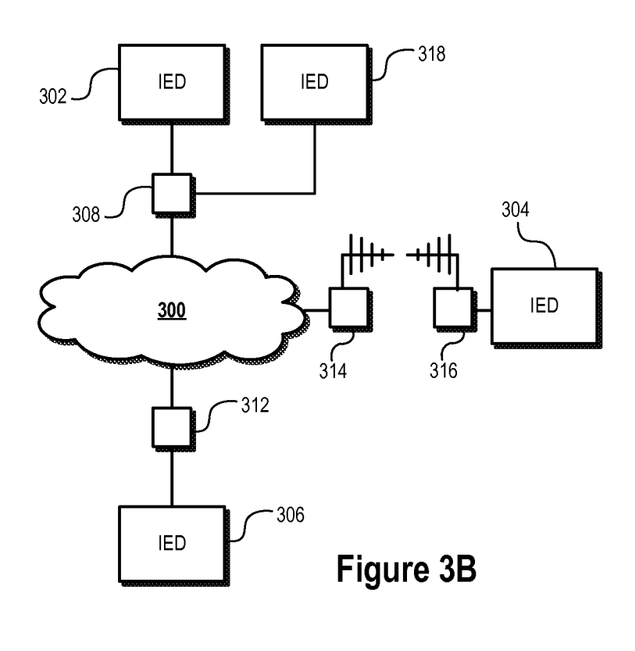
FIG. 3B illustrates intelligent electronic devices communicatively coupled with a network via network devices and network radios consistent with embodiments disclosed herein.

FIG. 3B illustrates IEDS 302-306, 318, 320 communicatively coupled with a network 300 via network devices 308, 312 and network radios 314, 316 consistent with embodiments disclosed herein. Certain elements of the exemplary system illustrated in FIG. 3B may be similar to those illustrated in and described in reference to FIG. 3A and, accordingly, similar elements may be denoted with like numerals. As with FIG. 3A, although certain illustrated embodiments are discussed in reference to network switches 308, 312 and network radios 314, 316, further embodiments may be implemented in other suitable network devices.

IEDs 302-306, 318, 320 may be configured to communicate via a network 300 using messages (e.g., GOOSE messages) that, in certain embodiments, may provide an indication as to a data state and/or data state change of one or more components and/or conditions within an electrical power generation and delivery system. The network switches 308, 312 and/or and network radios 314, 316 may be configured to receive messages from the network 300 and to transmit certain messages to an associated IED 302-306, 318, 320. For example, network switch 308 may be configured to receive messages from the network 300 and to transmit certain of the received messages to IED 302 and/or IED 320. Similarly, IED 304, may communicate (e.g., exchange messages) with the network 300 via one or more network radios 314, 316 or other similar network devices implementing a wireless communication methodology.

In certain circumstances, a subscribing IED (e.g., IED 304) may include a finite receiving FIFO that may only store a predetermined number of messages, and thus may not be capable of storing certain messages if a significant number of messages are received in a relatively short period (e.g., during periods of high network message traffic). Similarly, a network radio (e.g., network radio 314) may have a limited transfer rate but a less restrictive receiving rate. For example, network radio 314 may have a 1 MB/second data transfer rate but a receiving rate that is substantially greater. Similarly, a wireless communication channel between network radio 314 and network 316 may have limited bandwidth. Messages may be lost due to these and other types of communication bottlenecks.

Consistent with certain embodiments, to mitigate issues attributed to network bottlenecking, network switches 308, 312 and/or and network radios 314, 316 may include one or more message buffers configured to store messages indicating data state changes in one or more messages received from the network 300. As detailed below in reference to FIG. 4A and FIG. 4B, messages stored in the one or more message buffers may be transmitted to a receiving IED 302-306, 318, 320, thereby ensuring that messages associated with a data state change are transmitted to the one or more IEDs 302-306, 318, 320, regardless of whether the network switches 308-312 are capable of processing all incoming message traffic from the network 300.

Figure 4A:
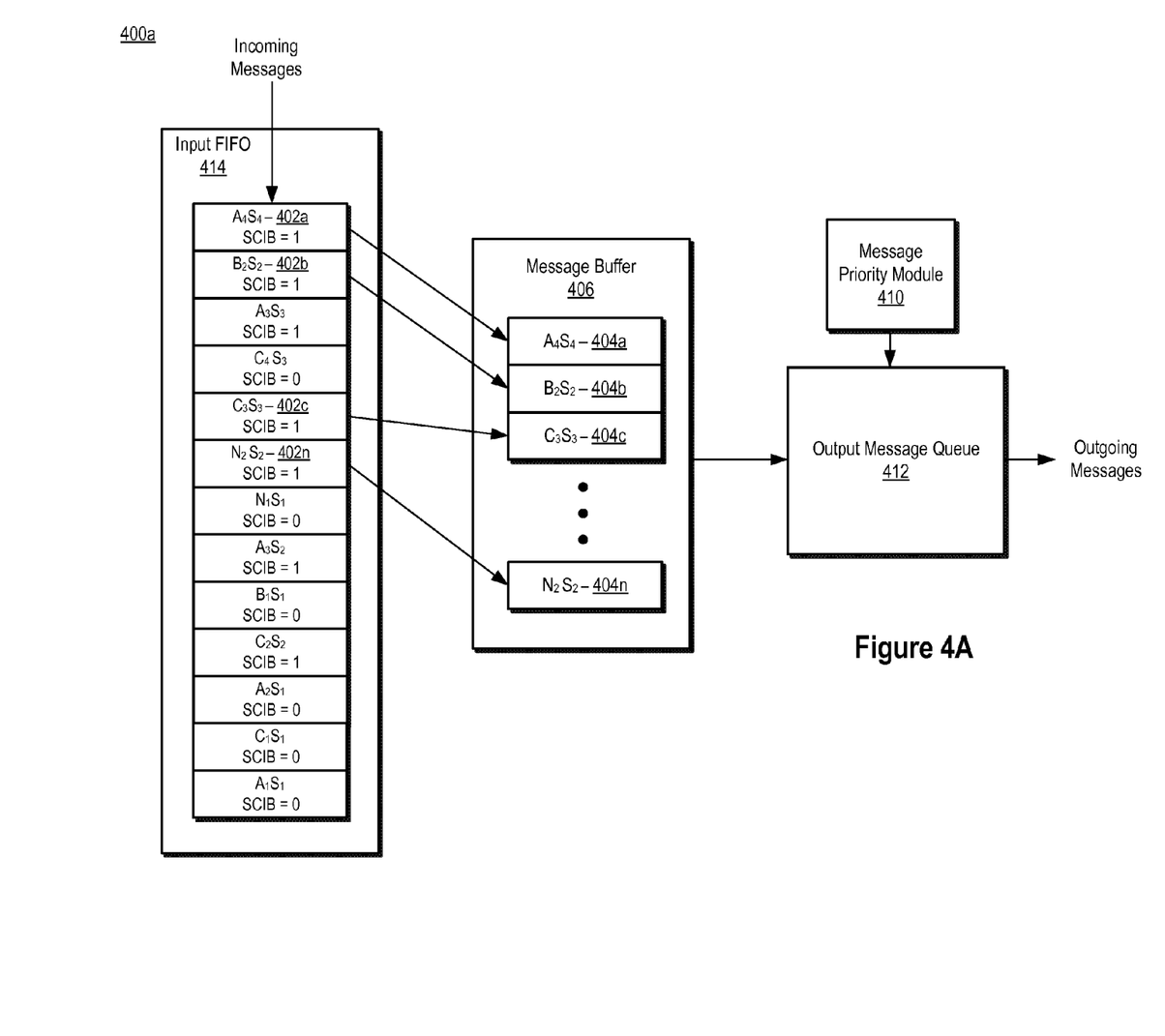
FIG. 4A illustrates a system including a message buffer consistent with embodiments disclosed herein.

FIG. 4A illustrates a system 400a including a message buffer 406 consistent with embodiments disclosed herein. In certain embodiments, the system 400a may be included in a network switch or any other suitable network device. The system 400a may receive incoming messages via, for example, an Ethernet interface, a Synchronized Optical Network (SONET), or the like. The incoming messages may be embodied as GOOSE messages, although any other suitable message format and/or communication protocol may be utilized. In certain embodiments, the incoming messages may provide an indication of a data state (e.g., a measured data state) of one or more components and/or conditions within an electrical power generation and delivery system, although other message and/or data types are also contemplated.

As discussed above, a message (e.g., a GOOSE message) may include an indication of whether the message indicates a data state that is different than a data state indicated by a preceding message. That is, a message may include an indication that data state associated with the message represents a data state change from a prior state. In certain embodiments, a message may utilize a DSCI included therein to indicate the occurrence of a data state change. For example, a DSCI included in a message may be set to "1" in one or more messages following a data state change event (e.g., the message indicating the changed data state), and may be set to a different value when a message is associated with a subsequent data state change event (e.g., a message repeating a previously communicated data state). By utilizing a DSCI, a receiving device may determine that a particular message indicates a recent data state change without having to examine certain contents (e.g., data state information) of the message and/or previously received messages.

Incoming messages may be received via the network from one or more IEDs or other system components. In certain embodiments, the incoming messages may be received from IEDs and/or system components tow which the system 400a and/or an associated IED is subscribed. For example, as illustrated, a first IED may generate incoming messages $A_1S_n$-$A_4S_n$, a second IED may generate incoming messages $B_1S_n$-$B_2S_n$, a third IED may generate incoming messages $C_1S_n$-$C_4S_n$, an Nth IED may generate incoming messages $N_1S_n$-$N_2S_n$, and so on, where $S_n$ indicates a particular data state associated with a message (e.g., a "n" data state). As messages are received, they may be placed in a receiving buffer or a receiving FIFO 414. In some embodiments, the FIFO 414 may be configured as a circular buffer. In certain embodiments, the receiving FIFO 414 may have a finite message capacity. A microprocessor included in a network device incorporating system 400 may execute a network data processing module and examine the contents of the FIFO 414. Messages generated by a particular IED may be identified using certain identifying information (e.g., subscription identifiers) associated with and/or included in the received messages.

The most recent messages indicating a data state change received from a particular IED, may be stored in a message buffer 406, which in certain embodiments may be embodied as a one-message buffer. For example, as illustrated, the most recent or newest messages indicating a data state change (e.g., messages 402a, 402b, 402c . . . 402n) associated with a particular subscription identifier may be stored in a buffer included in the message buffer 406 associated with the subscription identifier (e.g., buffered messages 404a, 404b, 404c . . . 404n). In certain embodiments, the most recent messages indicating a data state change received from a particular IED may be identified, at least in part, by identification information associated with the received messages and/or data state change information associated with and/or included in the messages (e.g., an DSCI). In further embodiments, the most recent messages indicating a data state change received from a particular IED may be identified in part by comparing data state information associated with the received message with data state information associated with a preceding message received from the IED (e.g., comparing the prior data state with the current data state to determine if a change has occurred). As the most recent or newest messages indicating a data state change associated with a particular subscription identifier are stored in a discrete buffer associated with the identifier, the likelihood of certain new data state change messages being lost due to overflow of the receiving FIFO 414 under heavy network and message traffic conditions is reduced, and the transmission of messages indicating a data state change can be prioritized.

The system 400 may further include an output message queue 412 that, in certain embodiments, may be embodied as an output FIFO or other similar buffering structure. Data state change messages (e.g., messages 404a, 404b, 404c . . . 404n, and 416c) stored in the message buffer 406 may be placed in the output message queue 412 for transmission to an associated IED from the network switch or other network device incorporating system 400. In certain embodiments, the order in which messages are placed in the output message queue 412 and are transmitted therefrom may be based on priority information provided by a message priority module 410. For example, messages associated with certain identifiers (e.g., messages originating from certain high priority IEDs) may have a higher priority than messages associated with other identifiers (e.g., messages originating from lower priority IEDs), and may thus be given a higher transmission priority (e.g., transmitted first). Similarly, messages indicating certain data state changes may be given transmission priority. In further embodiments, the order in which the messages are placed in the output message queue 412 and are transmitted therefrom may be based on the relative time the messages were received by the system 400. For example, messages stored in the message buffer 406 may be placed in the output message queue 412 based, at least in part, in the order in which the messages were received by the system 400 (e.g., chronologically, reverse chronologically, or the like).

Figure 4B:
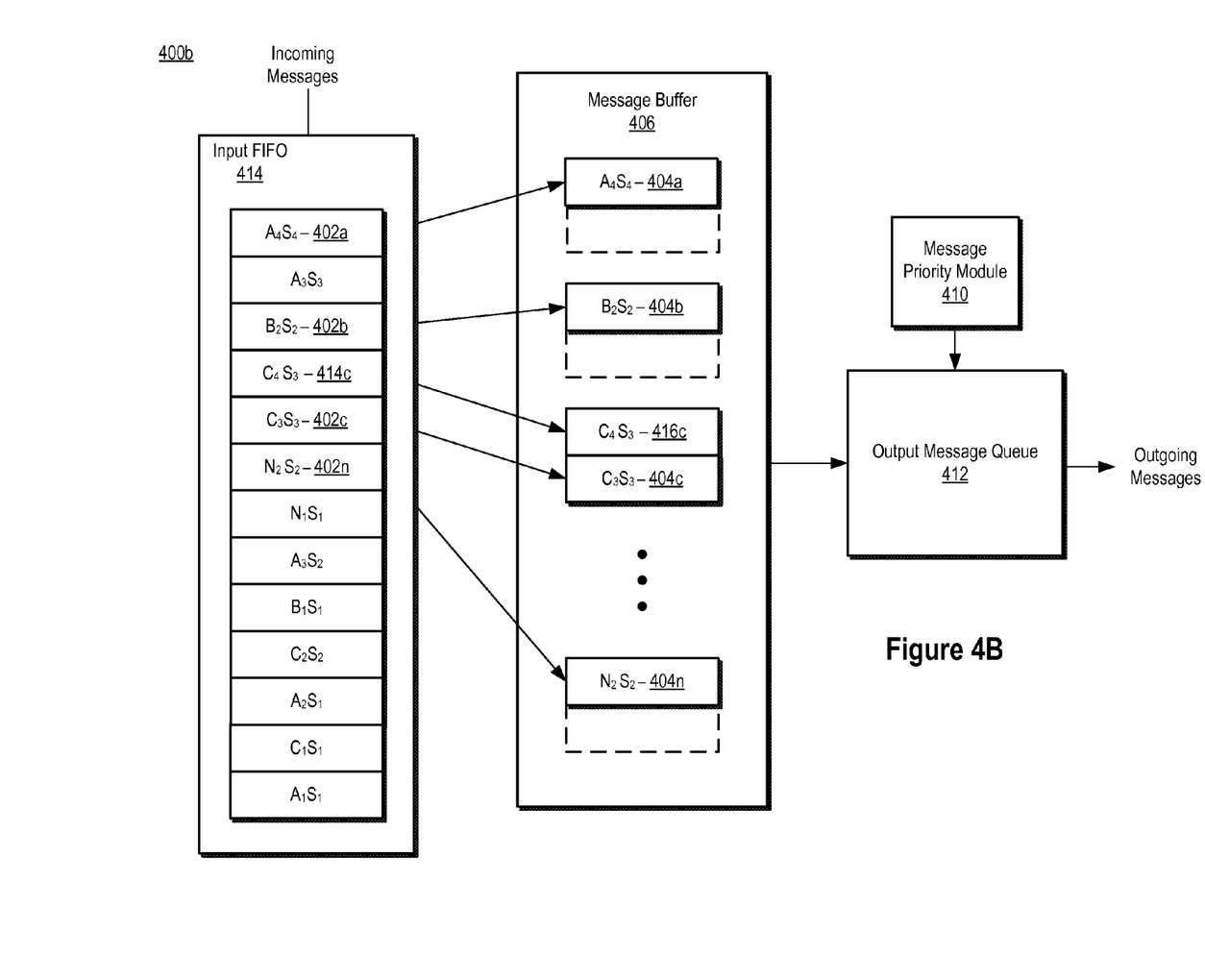
FIG. 4B illustrates another system including a message buffer consistent with embodiments disclosed herein.

FIG. 4B illustrates a system 400b including a message buffer 406 consistent with embodiments disclosed herein. Certain elements of the exemplary system illustrated in FIG. 4B may be similar to those illustrated in and described in reference to FIG. 4A and, accordingly, similar elements may be denoted with like numerals. In certain embodiments, the system 400b may be included in a network switch or any other suitable network device. The system 400b may receive incoming messages via, for example, an Ethernet interface, a SONET interface, or the like. The incoming messages may be embodied as GOOSE messages, although any other suitable message format and/or communication protocol may be utilized. In certain embodiments, the incoming messages may provide an indication of a data state (e.g., a measured data state) of one or more components and/or conditions within an electrical power generation and delivery system, although other message and/or data types are also contemplated.

As discussed above, a message (e.g., a GOOSE message) may include an indication of whether the message indicates a data state that is different than a data state indicated by a preceding message. In certain embodiments, a message may utilize an DSCI included therein to indicate the occurrence of a data state change. By utilizing an DSCI, a receiving device may determine that a particular message indicates a recent data state change without having to examine certain contents (e.g., data state information) of the message and/or previously received messages.

Incoming messages may be received via the network from one or more IEDs or other system components. In certain embodiments, the incoming messages may be received from IEDs and/or system comments that the system 400a and/or an associated IED subscribe to. For example, as illustrated, a first IED may generate incoming messages $A_1S_n$-$A_4S_n$, a second IED may generate incoming messages $B_1S_n$-$B_2S_n$, a third IED may generate incoming messages $C_1S_n$-$C_4S_n$, an Nth IED may generate incoming messages $N_1S_n$-$N_2S_n$, and so on, where $S_n$ indicates a particular data state associated with a message (e.g., a "n" data state). As messages are received, they may be placed in a receiving buffer or a receiving FIFO 414, which may be implemented as a circular buffer. In certain embodiments, the receiving FIFO 414 may have a finite message capacity. A microprocessor included in a network device incorporating system 400 may execute a network data processing module (not shown) and examine the contents of the FIFO 414. Messages generated by a particular IED may be identified using certain identifying information (e.g., subscription identifiers) associated with and/or included in the received messages.

The most recent messages indicating a data state change received from a particular IED, may be stored in a message buffer 406, which in certain embodiments may be embodied as a multiple-message buffer. For example, as illustrated, the most recent or newest messages indicating a data state change (e.g., messages 402a, 402b, 402c . . . 402n) associated with a particular subscription identifier may be stored in a buffer included in the message buffer 406 associated with the subscription identifier (e.g., buffered messages 404a, 404b, 404c . . . 404n). In certain embodiments, the most recent messages indicating a data state change received from a particular IED may be identified, at least in part, by identification information associated with the received messages and/or data state change information associated with and/or included in the messages (e.g., an DSCI). In further embodiments, the most recent messages indicating a data state change received from a particular IED may be identified in part by comparing data state information associated with the received message with data state information associated with a preceding message received from the IED (e.g., comparing the prior data state with the current data state to determine if a change has occurred).

In addition to storing the most recent messages indicating a data state change from a particular IED, the message buffer 406 may also store the most recent message (e.g., freshest) received from a particular IED regardless of whether the message indicates a data state change. For example, as illustrated, received message 414c does not indicate a data state change from the prior message received from the associated IED, but nevertheless may be stored in the message buffer 406 as message 416c as the most recent or freshest message received from the IED. As the most recent or newest messages indicating a data state change and the most recent or freshest message associated with a particular subscription identifier are stored in a discrete buffer associated with the identifier, the likelihood of certain new data state change messages being lost due to overflow of the receiving FIFO 414 under heavy network and message traffic conditions is reduced, and the transmission of messages indicating a data state change can be prioritized.

The system 400 may further include an output message queue 412 that, in certain embodiments, may be embodied as an output FIFO or other similar buffering structure. Data state change messages (e.g., messages 404a, 404b, 404c . . . 404n, and 416c) stored in the message buffer 406 may be placed in the output message queue 412 for transmission to an associated IED from the network switch or other network device incorporating system 400. In certain embodiments, the order in which messages are placed in the output message queue 412 and are transmitted therefrom may be based on priority information provided by a message priority module 410. For example, messages associated with certain identifiers (e.g., messages originating from certain high priority IEDs) may have a higher priority than messages associated with other identifiers (e.g., messages originating from lower priority IEDs), and may thus be given a higher transmission priority (e.g., transmitted first). Similarly, messages indicating certain data state changes may be given transmission priority. In further embodiments, the order in which the messages are placed in the output message queue 412 and are transmitted therefrom may be based on the relative time the messages were received by the system 400. For example, messages stored in the message buffer 406 may be placed in the output message queue 412 based, at least in part, in the order in which the messages were received by the system 400 (e.g., chronologically, reverse chronologically, or the like).

Figure 5:
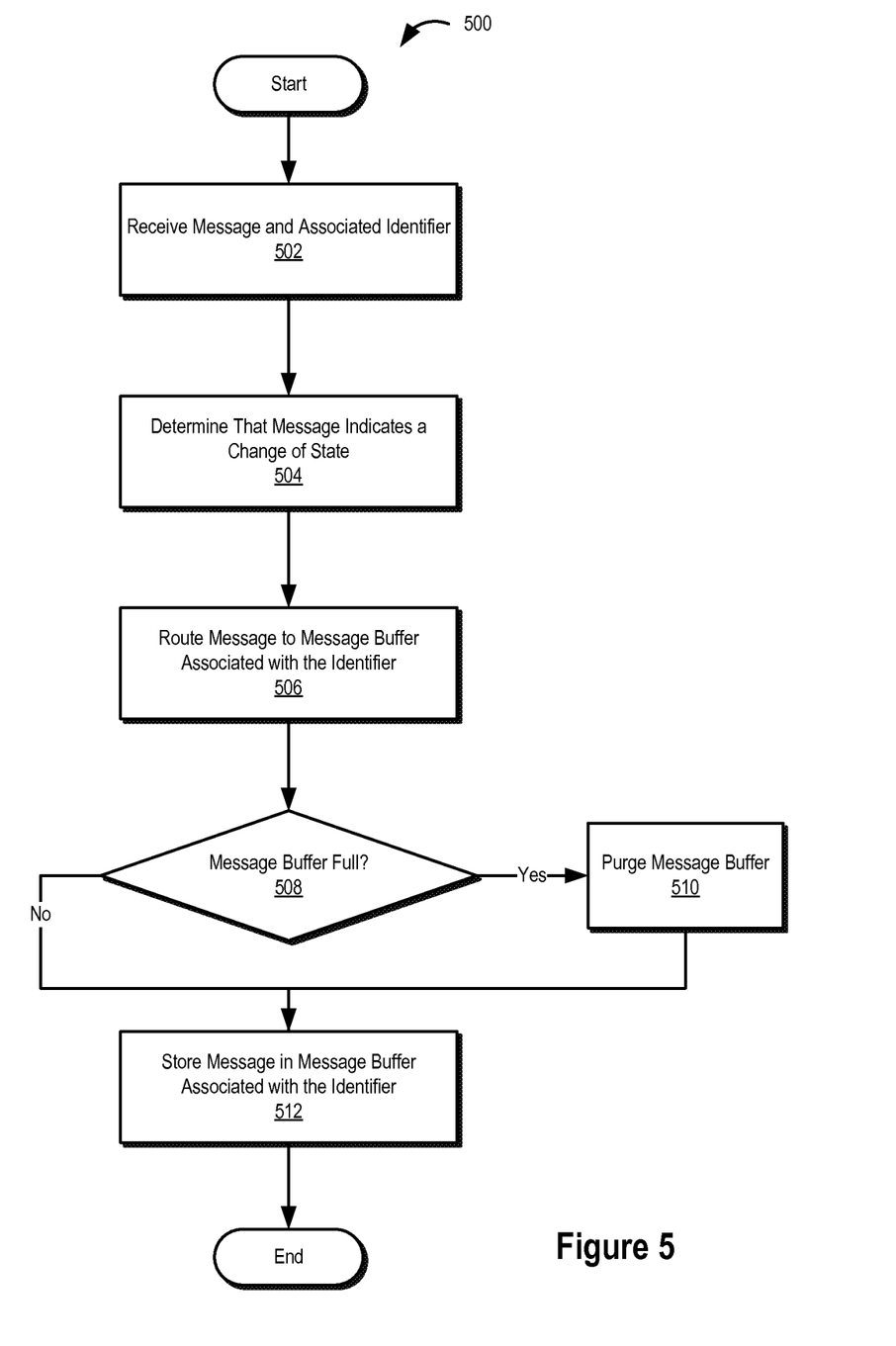
FIG. 5 illustrates a flow chart of a method for managing communication between devices in an electric power generation and delivery system consistent with embodiments disclosed herein.

FIG. 5 illustrates a flow chart of a method 500 for managing communication between devices in an electric power generation and delivery system consistent with embodiments disclosed herein. Particularly, the illustrated method 500 may be performed by a network system or other network device that, in certain embodiments, may incorporate features of the systems 400a, 400b illustrated in FIG. 4A and FIG. 4B. At 502, a message and an associated identifier may be received via a network and/or communication interface of a network device. In certain embodiments, the message may be a GOOSE message and the identifier may be a subscription identifier.

At 504, a determination may be made that the received message is the most recently received message (e.g., freshest) indicating a data state change associated with the identifier. In certain embodiments, this may involve examining a DSCI associated with and/or included in the message. In further embodiments, this may involve examining data state change information included in the message and/or previously received message to determine if a data state change has occurred. If the received message is the most recently received message indicating a data state change associated with the identifier, at 506, the message may be routed to a message buffer associated with the identifier. In certain embodiments, the message buffer may be a one-message buffer. In further embodiments, a determination may be made that the received message is the most recently received message (e.g., the freshest message) associated with the identifier. At 508, a determination may be made whether the message buffer associated with the identifier is full. If the buffer is full, at 510, the message buffer may be purged at least partially (e.g., emptied or erased). If the message buffer is not full, at 512 the message may be stored in the message buffer associated with the identifier. As discussed above, the message stored in the message buffer may then be placed in an output message queue based on, for example, a priority associated with the corresponding identifier, a relative time in which the message was received by the network device, or any other suitable queueing methodology. The message may then be transmitted by the network device to an associated IED from the output message queue.

Figure 6:
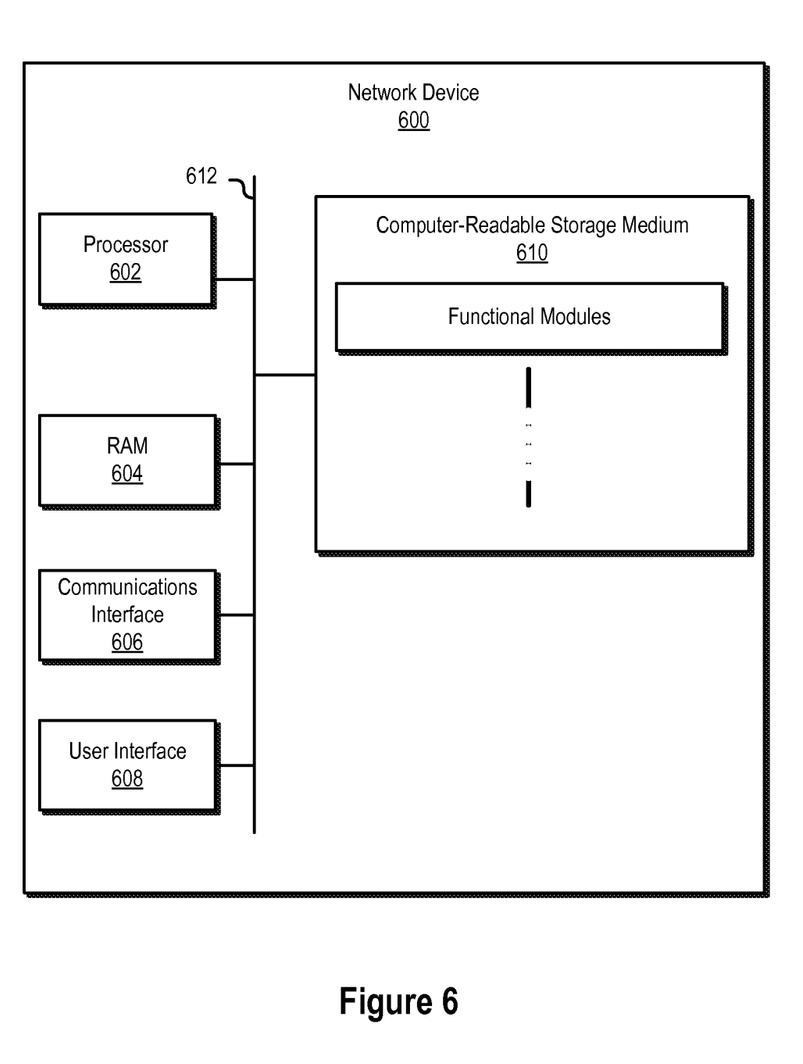
FIG. 6 illustrates a block diagram of a network device for implementing certain embodiments of the systems and methods disclosed herein.

FIG. 6 illustrates a block diagram of a network device 600 for implementing certain embodiments of the systems and methods disclosed herein. In certain embodiments, the network device 600 may be a network switch, modem, router, firewall, virtual private network server, and/or and any other suitable network device or system. Further embodiments may be implemented in an IED. As illustrated, the computer system 600 may include a processor 602, a random access memory (RAM) 604, a communications interface 606, a user interface 608, and/or a non-transitory computer-readable storage medium 610. The processor 602, RAM 604, communications interface 606, user interface 608, and computer-readable storage medium 610 may be communicatively coupled to each other via a common data bus 612. In some embodiments, the various components of the network device 600 may be implemented using hardware, software, firmware, and/or any combination thereof.

The user interface 608 may be used to display an interactive interface to a user. The user interface 608 may be integrated in the computer system 600 or, alternatively, may be a user interface for a laptop or other similar device communicatively coupled with the computer system 600. In certain embodiments, the user interface 600 may be produced on a touch screen display. The communications interface 606 may be any interface capable of communicating with other computer systems and/or other equipment (e.g., remote network equipment) communicatively coupled to computer system 600.

The processor 602 may include one or more general purpose processors, application specific processors, microcontrollers, digital signal processors, FPGAs, or any other customizable or programmable processing device. The processor 602 may be configured to execute computer-readable instructions stored on the non-transitory computer-readable storage medium 610. In some embodiments, the computer-readable instructions may be computer-executable functional modules. For example, the computer-readable instructions may include one or more functional modules configured to implement all or part of the functionality of the systems and methods described above in reference to FIGS. 1-5, including a network device processing module and message priority module 410.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. A method for managing communication messages comprising:
a network device receiving via a communications interface a message included in a multi-cast message stream from a first intelligent electronic device (IED), the message including information identifying a publishing IED and data state information;
the network device determining, using a processor included in the network device, that the message represents a data state change associated with the publishing IED based on a state of a data state change indicator included in the message, the state of the data state change indicator providing an indication of whether the message represents a data state change relative to a prior message;
the network device storing the message in a message buffer associated with the information identifying the publishing IED;
the network device placing the stored message in an output message queue; and
the network device prioritizing the stored message according to a message queue priority designation and transmitting the stored message to a second IED from the output message queue using the communications interface based on the message queue priority designation, the second IED being separate from the network device and being configured to engage in at least one control action based on the transmitted stored message.

2. The method of claim 1, wherein the method further comprises:
prior to storing the message, determining whether the message buffer is full; and
if the message buffer is full, at least partially purging the message buffer.

3. The method of claim 1, wherein the data state change indicator comprises a data state change indicator bit included in the message.

4. The method of claim 1, wherein the information identifying the publishing IED comprises a subscription identifier.

5. The method of claim 1, wherein the message comprises an IEC 61850 Generic Object Oriented Substation Events (GOOSE) message.

6. The method of claim 1, wherein the stored message is placed in the output message queue based, at least in part, on the order in which the message was received by the network device.

7. The method of claim 1, wherein the communications interface comprises a wireless communications interface.

8. The method of claim 1, wherein the message queue priority designation is based on the information identifying the publishing IED.

9. The method of claim 1, wherein the message queue priority designation is based on a type of the data state change represented by the contents of the message.

10. A non-transitory computer-readable storage medium storing instructions that, when executed by a processor of a network device for managing communication messages, cause the processor of the network device to:
receive via a communication interface a message included in a multi-cast message stream from a first intelligent electronic device (IED), the message including information identifying a publishing IED and a data state indicator, the state of the data state change indicator providing an indication of whether the message represents a data state change relative to a prior message;
determine, using the processor included in the network device, that the message represents a data state change associated with the publishing IED;
store the message in a message buffer associated with the information identifying the publishing IED;
place the stored message in an output message queue;
prioritize the stored message according to a message queue priority designation; and
transmit the stored message from the output message queue of the network device to a second IED using the communications interface based on the message queue priority designation, the second IED being separate from the network device and being configured to engage in at least one control action based on the transmitted stored message.

11. The non-transitory computer-readable storage medium of claim 10, wherein the data state change indicator comprises a data state change indicator bit included in the message.

12. The non-transitory computer-readable storage medium of claim 10, wherein the information identifying the publishing IED comprises a subscription identifier.

13. The non-transitory computer-readable storage medium of claim 10, wherein the message comprises a GOOSE message.

14. The non-transitory computer-readable storage medium of claim 10, wherein the stored message is placed in the output message queue based, at least in part, on the order in which the message was received by the network device.

15. A network device for managing communication messages in a network comprising:
a network interface receiving and transmitting a multi-cast message stream between a first intelligent electronic device (IED) and a second IED separate from the network device;
a computer processor determining that a message included in the multi-cast message stream from the first IED represents a data state change associated with a publishing IED based on the state of a data state change indicator included in the message, the state of the data state change indicator providing an indication of whether the message represents a data state change relative to a prior message;

a message buffer storing the message based on the determination made by the computer processor; and a message output queue receiving the stored message;

wherein the network interface transmitting the stored message to the second IED communicatively coupled to the network interface from the output message queue based a message queue priority designation associated with the stored message, the message queue priority designation being based on a type of the data state change represented by the contents of the message, the second IED being configured to engage in at least one control action based on the stored message.

16. The network device of claim 15, wherein the message comprises a GOOSE message.

17. The network device of claim 15, wherein the network interface is a wireless communications interface.

\* \* \* \* \*